United States Patent [19]

Krude

[11] 4,070,872
[45] Jan. 31, 1978

[54] UNIVERSAL JOINT

[75] Inventor: Werner Krude, Neunkirchen, Germany

[73] Assignee: Uni-Cardan AG, Lohmar, Germany

[21] Appl. No.: 725,924

[22] Filed: Sept. 23, 1976

[30] Foreign Application Priority Data

Sept. 25, 1975 Germany .............................. 2542733

[51] Int. Cl.² .............................................. F16D 3/30
[52] U.S. Cl. ............................................ 64/21; 64/8
[58] Field of Search .......................... 64/8, 21, 17 R, 7

[56] References Cited

U.S. PATENT DOCUMENTS

| | | | |
|---|---|---|---|
| 2,033,583 | 3/1936 | McCarrell | 64/21 |
| 2,049,584 | 7/1936 | Rzeppa | 64/21 |
| 2,150,942 | 3/1939 | Rzeppa | 64/21 |
| 3,002,364 | 10/1961 | Bellomo | 64/8 |
| 3,592,023 | 7/1971 | Okoshi | 64/21 |

*Primary Examiner*—Samuel Scott
*Assistant Examiner*—R.C. Turner
*Attorney, Agent, or Firm*—Edmund M. Jaskiewicz

[57] ABSTRACT

A universal joint has an outer joint member with circular grooves in the inner surface of a spherical cavity therein and an inner joint member is positioned within the cavity. The outer surface of the inner joint member is also provided with grooves and torque transmitting balls are received in corresponding grooves of the outer and inner joint members. The centerlines of the two outer joint member circular grooves are located in planes which are parallel with each other and parallel to the axis of the outer joint member and these planes are positioned equidistantly on opposite sides of the rotary axis. The inner joint member has partially circular or arcuate grooves arranged in pairs such that their centerlines extend in planes perpendicular to the planes of the outer joint member grooves.

5 Claims, 5 Drawing Figures

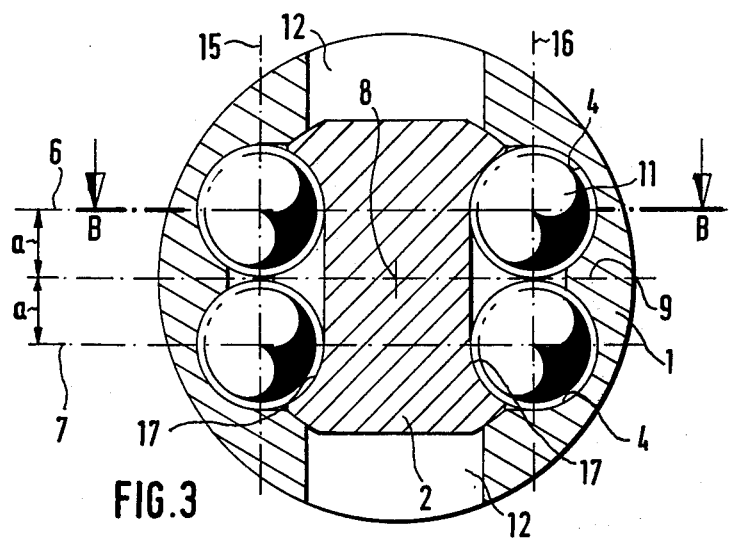
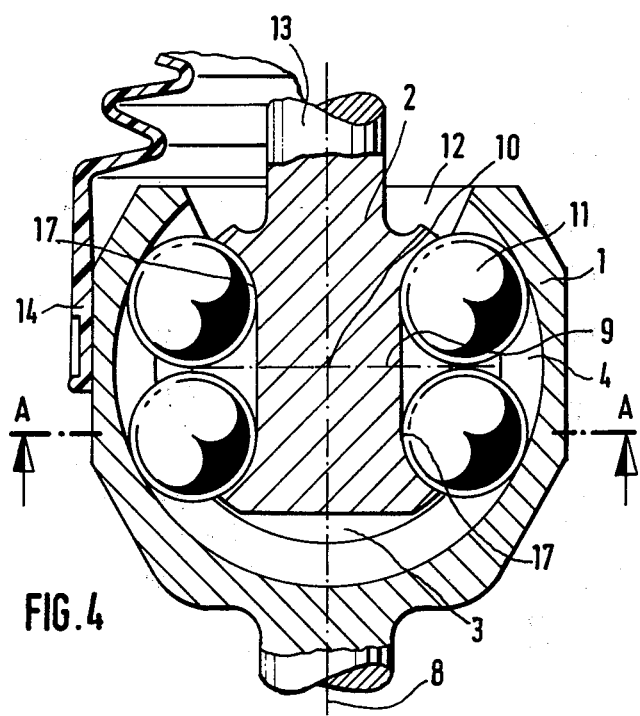

UNIVERSAL JOINT

The present invention relates to a universal joint, more particularly, to the groove arrangement in the opposed surfaces of outer and inner joint members of the universal joint.

One form of a universal joint comprises a hollow outer joint member having a cavity and circular grooves are formed in the spherical inner surface of the cavity. An inner joint member is positioned within the cavity and a torque transmitting ball is positioned in each pair of cooperating grooves of the outer and inner joint members. Such a universal joint has the disadvantage of a relatively low torque transmitting capacity and the conformation of the grooves permits a relatively limited angular deflection or bending of the universal joint.

It is therefore the principal object of the present invention to provide an improved universal joint of the type as described above.

It is another object of the present invention to provide such a universal joint which has a high torque capacity, occupies a small space, consists of a small number of component parts but is relatively easy to manufacture.

According to one aspect of the present invention a universal joint may comprise a hollow outer joint member having a spherical inner surface therein and two circular grooves in the inner surface. An inner joint member is positioned within the outer joint member and has recesses on its outer surface. Balls are jointly received in the outer joint member grooves and inner joint member recesses to transmit torque therebetween. The centerlines of the outer joint member grooves define first planes which are parallel with each other and parallel with the rotary axis of the outer joint member. The first planes are positioned on opposite sides of the rotary axis and are spaced equidistantly therefrom. The inner member recesses have means therein for guiding the movements of balls received in the recesses along centerlines which define second planes perpendicular to the first planes.

The universal joint of the present invention is advantageous in that the inner joint member has an integral or one-piece construction which eliminates the necessity for any meshing torque transmitting formations between the shaft and inner joint member and any structure for fixing relatively these components to each other. In addition, the outer joint member cavity and outer surface of the inner joint member can be machined to relatively rough tolerances since these two joint members are aligned with respect to each other exclusively by the torque transmitting balls. As a result, a certain degree of clearance or play is acceptable.

A further advantage is that all of the ball grooves in the outer joint member are accessible through an opening therein and can be produced in one working pass. The grooves of the inner joint member can be formed with only two working passes at the most. The opening in the outer joint member also facilitates assembly of the joint since the torque transmitting shaft of the inner joint member can be temporarily accommodated within the opening when the shaft is tilted through an angle of 90°. In this tilted position of the shaft and inner joint member the torque transmitting balls can be easily assembled within the joint.

Other objects and advantages of the present invention will be readily apparent upon reference to the accompanying description when taken in conjunction with the following drawings, which are exemplary, wherein;

FIG. 3 is a sectional view taken along the line A—A of FIG. 4 at right angles to the axis of rotation of an eight-ball universal joint according to the present invention;

FIG. 4 is a sectional view taken along the line B—B of FIG. 3; and

Proceeding next to the drawings wherein like reference symbols indicate the same parts throughout the various views a specific embodiment and modifications of the present invention will be described in detail.

Figure 1:
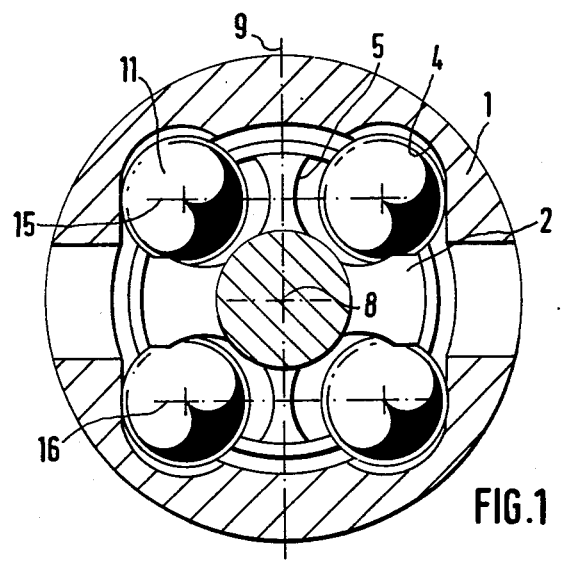
FIG. 1 is a sectional view taken at right angles through the axis of rotation in the plane of the balls of a four-ball universal joint according to the present invention.
Figure 2:
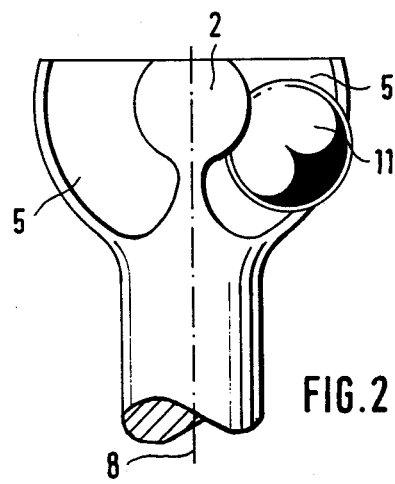
FIG. 2 is an elevational view of the inner joint member of the joint of FIG. 1 showing the annular grooves therein.

In FIGS. 1 and 2 there is illustrated a four-ball universal joint according to the present invention which comprises an outer joint member 1 which is hollow so as to have a cavity or chamber therein having a spherical inner surface in which are formed two circular grooves 4. An inner joint member 2 is positioned within the cavity of the outer joint member and has an outer surface in which are formed two pairs of grooves 5 with the pairs being opposed from each other and a pair of grooves each having a common generatrix axis 9 and having the same radius of curvature. The axis 9 passes through and is perpendicular to the axis of rotation 8 of the joint.

The pairs of grooves 5 of the inner joint member 2 are positioned in planes 15 and 16 respectively. The planes 15 and 16 are parallel to each other and are also parallel with but spaced equidistantly on opposite sides of the axis of rotation 8. A torque transmitting ball 11 is jointly received in a groove 4 and a groove 5.

In the universal joint of FIGS. 3 and 4, the outer joint member 1 similarly has two circular grooves 4 in its spherical inner surface and the inner joint member 2 is positioned within the cavity 3 of the outer joint member 1. The circular grooves 4 have their centerlines respectively in planes 6 and 7 which are parallel to each other and also parallel with the axis of rotation 8 of the joint. The planes 6 and 7 are positioned on opposite sides of the axis of rotation 8 and are equidistantly spaced from the axis by the distance $a$.

The outer surface of the inner joint member 2 is provided with two oppositely disposed annular grooves 17 which have a common generatrix axis 9 passing through the center of the joint 10.

Each annular groove or recess 17 accommodates four torque transmitting balls 11 and these balls are disposed in pairs so that one pair of balls is positioned axially within one of the circular grooves 4 and the other pair of balls positioned axially in the other groove 4 so that in each groove two balls 11 will follow each other with respect to the axis of rotation 8.

The outer joint member 1 is further provided with notched openings 12 which are opposed from each other and positioned at right angles with respect to the planes in which the torque transmitting balls are positioned. The openings 12 facilitate forming the circular grooves 4 in the outer joint member since these openings enable a machine tool spindle fitted with a suitable tool, such as a milling cutter, to be inserted through the openings. The openings 12 also facilitate assembly of the joint since after the inner joint member 2 has been inserted into the outer joint member 1, the shaft 13 which is integral with the inner joint member 2 can be tilted through an angle of 90° so that the shaft 13 is accommodated within the notched opening 12. The inner joint member 2 is then rotated through 90° so that the annular grooves 5 are positioned at the level of an opening 12. With the components of the joint in this position, two or four-balls 11 may be readily inserted into one of the annular grooves 5. The shaft is subsequently tilted back to its straight or unbent position and the inner joint member rotated again through 90° to completely assemble the joint. A protective boot in the form of a flexible bellows 14 of a resilient material as known in the art has one end connected to the outer surface of the outer joint member 1 by means of a clamping ring or the like and the other end connected to the outer surface of the shaft 13 in a manner known in the art.

Figure 5:
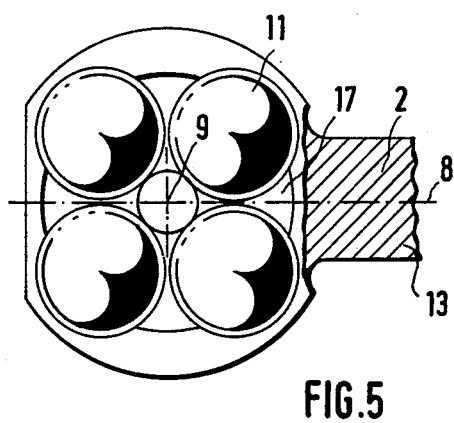
FIG. 5 is an elevational view of the inner joint member of FIGS. 3 and 4 showing the annular grooves therein.

The annular groove 17 in the inner joint member 2 is shown more clearly in FIG. 5 wherein it is apparent that the groove is determined by the generatrix axis 9 which extends through the center of the joint 10 and is perpendicular with respect to the axis of rotation 8. It can also be seen that the annular groove or recess 17 accommodates four torque transmitting balls 11.

The universal joint of FIGS. 3 and 4 wherein the inner joint member has two relatively oppositely positioned circularly arcuate recesses each of which accommodates four torque transmitting balls arranged in pairs in the circular grooves of the outer joint member has a substantially increased torque transmitting capacity because of this successive positioning of two balls in each of the outer joint member grooves. When eight torque transmitting balls are employed in the joint as in FIGS. 3 and 4, the concentric alignment of the inner and outer joint members is achieved solely by means of the balls so that the tolerances of the surfaces of the inner and outer joint members can be relatively coarse. Such a joint is assembled in essentially the same manner as the four-ball universal joint the assembly of which was described above.

When the recess for receiving the torque transmitting balls on the inner joint member is in the form of an annular groove, the cross-section of this groove corresponds to the dimensions of the torque transmitting balls and the generatrix axis extends between the balls as shown in FIGS. 3 and 5.

Thus it can be seen that the present invention has disclosed a universal joint which is simple in construction, employs a relatively small number of components and is capable of transmitting relatively high torque.

It will be understood that this invention is susceptible to modification in order to adapt it to different usages and conditions, and accordingly, it is desired to comprehend such modifications within this invention as may fall within the scope of appended claims.

What is claimed is:

1. A universal joint comprising a hollow joint member having a spherical inner surface therein and there being two circular grooves in said inner surface, an inner joint member within said outer joint member and having an outer surface with recesses therein, balls jointly received in said outer joint member grooves and said inner member recesses to transmit torque therebetween, the centerlines of said outer member grooves defining first planes which are parallel to each other and parallel with the rotary axis of the outer joint member, said first planes being positioned on opposite sides of said rotary axis and spaced equidistantly therefrom, said inner member recess having means for guiding movements of the balls therein along centerlines in second planes perpendicular to said first planes.

2. A universal joint as claimed in claim 1 wherein said inner joint member recess means comprises two oppositely disposed arcuate recesses, there being four balls arranged in each of said arcuate recesses, each pair of balls being positioned axially in an outer member groove.

3. A universal joint as claimed in claim 1 wherein said inner joint member recess means comprises two pairs of grooves, each pair of grooves having centerlines defining a second plane perpendicular to said first plane.

4. A universal joint as claimed in claim 1 wherein a said recess means comprises an annular groove having a generatrix extending between the balls.

5. A universal joint as claimed in claim 4 wherein said generatrix passes perpendicularly through the rotary axis of the outer joint member.

* * * * *